United States Patent
Benayoun et al.

(10) Patent No.: US 7,085,802 B1
(45) Date of Patent: Aug. 1, 2006

(54) DEVICE FOR CONNECTING TWO WORKSTATIONS WITH SEVERAL LINKS

(75) Inventors: Alain Benayoun, Cagnes sur Mer (FR); Patrick Michel, La Gaude (FR); Jean-Francois Le Pennec, Nice (FR); Gilles Toubol, Villeneuve Loubet (FR)

(73) Assignee: International Business Machines Corporation, Armonk, NY (US)

( * ) Notice: Subject to any disclaimer, the term of this patent is extended or adjusted under 35 U.S.C. 154(b) by 992 days.

(21) Appl. No.: 09/680,798

(22) Filed: Oct. 6, 2000

(30) Foreign Application Priority Data

Jan. 12, 1999 (EP) .................................. 00480012

(51) Int. Cl.
*G06F 13/00* (2006.01)

(52) U.S. Cl. ........................ 709/201; 709/224; 370/232

(58) Field of Classification Search ........ 709/200–201, 709/224–225, 235, 238; 370/232, 235, 358, 370/368
See application file for complete search history.

(56) References Cited

U.S. PATENT DOCUMENTS

| | | | |
|---|---|---|---|
| 6,038,674 A * | 3/2000 | Sasaki et al. ............... | 713/500 |
| 6,049,891 A * | 4/2000 | Inamoto ........................ | 714/6 |
| 6,310,881 B1 * | 10/2001 | Zikan et al. ................. | 370/401 |
| 6,321,272 B1 * | 11/2001 | Swales ........................ | 709/250 |
| 6,389,000 B1 * | 5/2002 | Jou ............................. | 370/342 |
| 6,393,587 B1 * | 5/2002 | Bucher et al. ................ | 714/39 |
| 6,560,233 B1 * | 5/2003 | Hatanaka et al. ............ | 370/401 |
| 6,732,305 B1 * | 5/2004 | Jones et al. .................. | 714/718 |
| 6,873,630 B1 * | 3/2005 | Muller et al. ................ | 370/542 |
| 2001/0052057 A1 * | 12/2001 | Lai et al. ..................... | 711/154 |

* cited by examiner

*Primary Examiner*—Moustafa M. Meky
(74) *Attorney, Agent, or Firm*—John R. Pivnichny; Dillon & Yudell LLP

(57) ABSTRACT

According to the invention, a device for transferring data between two workstations connected to a network is provided. This device comprises means for distributing data among a plurality of links of the network. Preferentially, the device comprises a dual-port memory for storing the data. In a preferred embodiment, the device further comprises a high speed interface for transmitting data from a workstation to the memory, associated with each link, a low speed interface for transmitting a part of the data from the memory to this link, and a controller for monitoring the data flow between the workstation and the plurality of links, by controlling the memory and the interfaces.

20 Claims, 16 Drawing Sheets

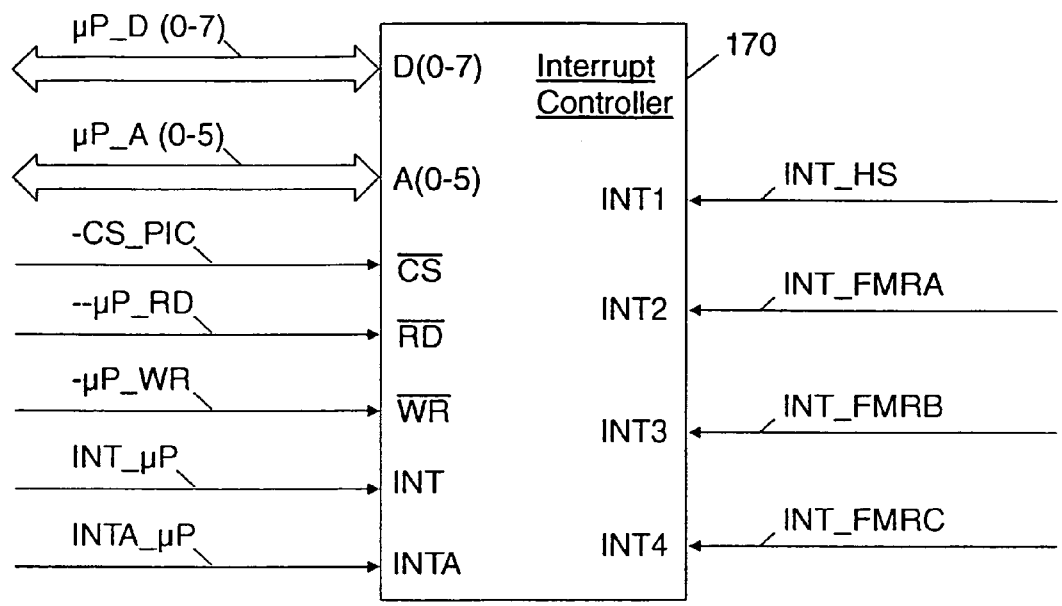
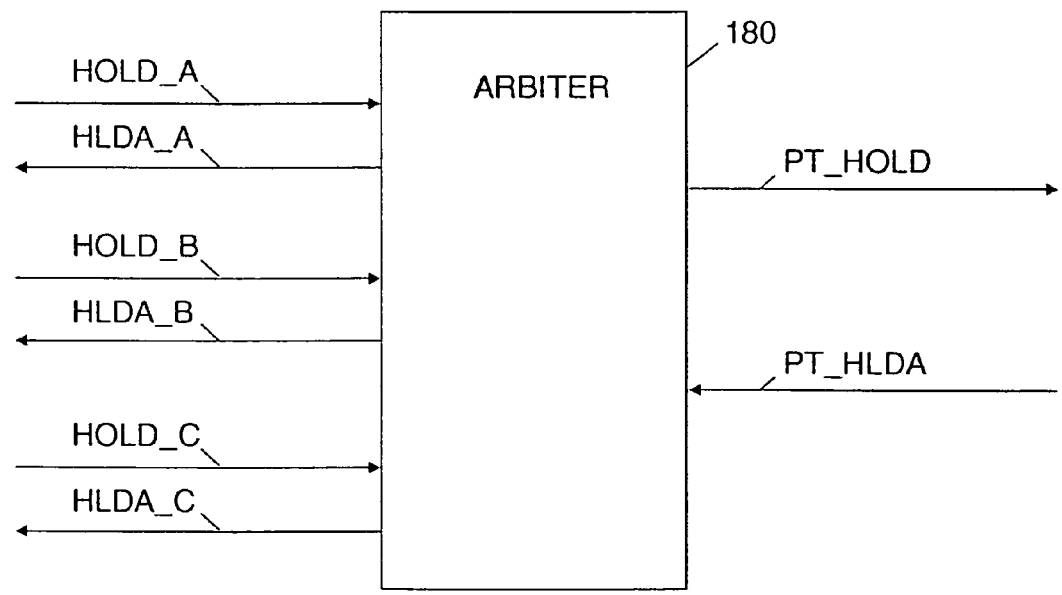
FIG. 10

Buffer Description

First address (xxx000H)→ Data byte 01 (managed by first low speed framer)
Data byte 02 (managed by first low speed framer)
Data byte 03 (managed by first low speed framer)
Data byte 04 (managed by first low speed framer)
Data byte 05 (managed by first low speed framer)
Data byte 06 (managed by second low speed framer)
Data byte 07 (managed by second low speed framer)
Data byte 08 (managed by third low speed framer)
Data byte 09 (managed by first low speed framer)
Data byte 10 (managed by first low speed framer)
Data byte 11 (managed by first low speed framer)
Data byte 12 (managed by first low speed framer)
Data byte 13 (managed by first low speed framer)
Data byte 14 (managed by second low speed framer)
Data byte 15 (managed by second low speed framer)
Data byte 16 (managed by third low speed framer)
Data byte 17 (managed by first low speed framer)
Data byte 18 (managed by first low speed framer)

•
•
•

Data byte 2041 (managed by first low speed framer)
Data byte 2042 (managed by first low speed framer)
Data byte 2043 (managed by first low speed framer)
Data byte 2044 (managed by first low speed framer)
Data byte 2045 (managed by first low speed framer)
Data byte 2046 (managed by second low speed framer)
Data byte 2047 (managed by second low speed framer)
Last address (xxx7FFH)→ Data byte 2048 (managed by third low speed framer)

FIG. 12

First Transaction Table

| Input address (lowest 11 bits) | Output address (lowest 11 bits) |
| --- | --- |
| 000 | 000 |
| 001 | 001 |
| 002 | 002 |
| 003 | 003 |
| 004 | 004 |
| 005 | 008 |
| 006 | 009 |
| 007 | 00A |
| 008 | 00B |
| 009 | 00C |
| 00A | 010 |
| 00B | 011 |
| 00C | 012 |
| 00D | 013 |
| 00E | 014 |
| 00F | 018 |
| 010 | 019 |
| 011 | 01A |
| ... | ... |
| 4FB | 7F8 |
| 4FC | 7F9 |
| 4FD | 7FA |
| 4FE | 7FB |
| 4FF | 7FC |

FIG. 13

Second Transaction Table

| Input address (lowest 11 bits) | Output address (lowest 11 bits) |
| --- | --- |
| 000 | 005 |
| 001 | 006 |
| 002 | 00D |
| 003 | 00E |
| 004 | 015 |
| 005 | 016 |
| 006 | 01D |
| 007 | 01E |
| 008 | 025 |
| 009 | 026 |
| 00A | 02D |
| 00B | 02E |
| 00C | 035 |
| 00D | 036 |
| 00E | 03D |
| 00F | 03E |
| 010 | 045 |
| 011 | 046 |
| ... | ... |
| 1FC | 7F5 |
| 1FD | 7F6 |
| 1FE | 7FD |
| 1FF | 7FE |

FIG. 14

Second Transaction Table

| Input address (lowest 11 bits) | Output address (lowest 11 bits) |
|---|---|
| 000 | 007 |
| 001 | 00F |
| 002 | 017 |
| 003 | 01F |
| 004 | 027 |
| 005 | 02F |
| 006 | 037 |
| 007 | 03F |
| 008 | 047 |
| 009 | 04F |
| 00A | 057 |
| 00B | 05F |
| 00C | 067 |
| 00D | 06F |
| 00E | 077 |
| 00F | 07F |
| 010 | 087 |
| 011 | 08F |
| ... | ... |
| 0FC | 7F7 |
| 0FD | 7EF |
| 0FE | 7F7 |
| 0FF | 7FF |

FIG. 15

DEVICE FOR CONNECTING TWO WORKSTATIONS WITH SEVERAL LINKS

BACKGROUND OF THE INVENTION

1. Technical Field

The present invention deals with data transfer between two workstations. A workstation is here considered as an equipment of any type provided for exchanging data with another equipment and it could be a personal computer or any kind of terminal.

2. Background Art

Usually, the data transfer is realized by means of a network, or more precisely with a link of this network. Such a link is generally characterized by the rate at which it forwards data and one distinguishes low speed links and high speed links. In a network, even if several link types are available, the digital link rates are fixed and they often do not fit the optimum rate at which a workstation can transfer data.

When the link rate is lower than this optimum rate, there is a waste of time and the workstation manages the data transfer during a period longer than it should be. When the link rate is higher than this optimum rate, the transmission efficiency of this link is reduced accordingly. Furthermore, the cost of the data transfer is increased since high speed digital links provided by telecommunication carriers are much more expensive than low speed links.

SUMMARY OF THE INVENTION

The present invention therefore concerns a device for connecting a workstation with a network in order to transfer data at a rate close to the optimum rate.

According to the invention, a device is provided for transferring data between two workstations connected to a network; this device comprises means for distributing said data among a plurality of links of said network.

Further, the device comprises a memory for storing said data.

Preferentially, this memory is a dual port static memory.

According to a preferred embodiment, the device comprises:

a high speed interface for transmitting data from a workstation to the memory, associated with each link, a low speed interface for transmitting a part of the data from the memory to the link, and a controller for monitoring the data flow between the workstation and the plurality of links, by controlling this memory and these interfaces.

Moreover, the high speed interface receiving data at an initial rate equal to the sum of the rates at which low speed interfaces transmit on the network, two at least of the low speed interfaces run at different rates.

Preferentially, each low speed interface running at a rate which is a fraction of the initial rate, all these fractions having a common denominator and at least one of these fractions being irreducible, the data flow is cyclically distributed among the low speed interfaces in such a way that each low speed interface receives a number of consecutive bytes from the flow equal to the numerator of its associated fraction.

According to a specific embodiment, at least one of these low speed interfaces comprises means for establishing a connection with a modem.

Likewise, the high speed interface comprises means for transferring data with a modem.

Besides, the device comprises:

associated with each link, a low speed interface for transmitting part of the data from the link to the memory, a high speed interface for transmitting data from the memory to a workstation, and a controller for, in a first state, monitoring the data flow between the plurality of links and the workstation by controlling the memory and these interfaces.

Further, the high speed interface receiving data at an initial rate equal to the sum of the rates at which low speed interfaces receive from the network, two at least of these low speed interfaces run at different rates.

Furthermore, each low speed interface running at a rate which is a fraction of the initial rate, all these fractions having a common denominator and at least one of these fractions being irreducible, the data flow is cyclically distributed among the low speed interfaces in such a way that each low speed interface receives a number of consecutive bytes from the flow equal to the numerator of its associated fraction.

Moreover:

the high speed interface is provided for alternately transmitting other data from the workstation to the memory, each low speed interface is alternately provided for transmitting a part of other data from the memory to the link, the controller, in a second state, monitoring the data flow between the workstation and the plurality of links.

BRIEF DESCRIPTION OF THE DRAWINGS

Embodiments of the present invention are described below by way of example only with reference to the accompanying drawings, wherein.

Identical elements appearing in several figures are attributed a single reference.

DETAILED DESCRIPTION OF THE INVENTION

Figure 1:
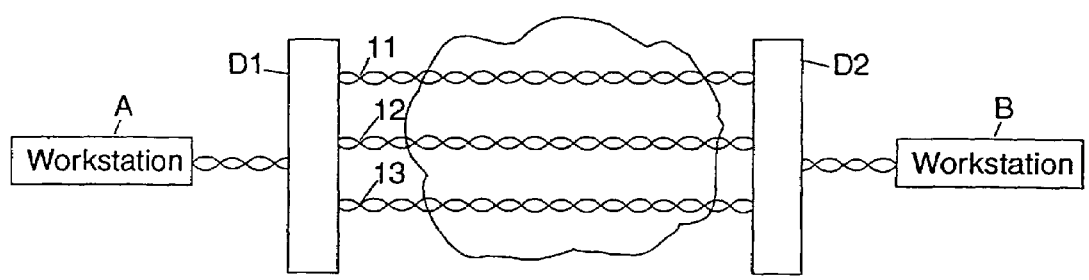
FIG. 1, the connection of two workstations with a network by means of the device according to the invention, FIG. 2, a diagram of this device, FIG. 3, a diagram of a high speed interface, FIG. 4, a diagram of a dual port static memory, FIG. 5, a diagram of a first low speed interface, FIG. 6, a diagram of a second low speed interface, FIG. 7, a diagram of a third low speed interface, FIG. 8, a diagram of a controller, FIGS. 9, 10 and 11 diagrams of logic circuits associated to the controller, FIG. 12, a diagram of a buffer in the static memory, FIGS. 13, 14 and 15, diagrams of translation tables respectively corresponding to first, second and third programmable read only memory located in the low speed interfaces, FIG. 16, another embodiment of a high speed interface, and FIG. 17, another embodiment of a low speed interface.

With reference to FIG. 1, the invention allows to transfer data between two workstations using three links 11, 12, 13 of a network. A first device D1 is connected from one side with a first workstation A and from the other side with first ends of these three links 11, 12, 13. A second device D2 is connected from one side with a second workstation B and from the other side with the other ends of these links 11, 12, 13. Both devices D1 and D2 where lies the present invention are identical.

Figure 2:
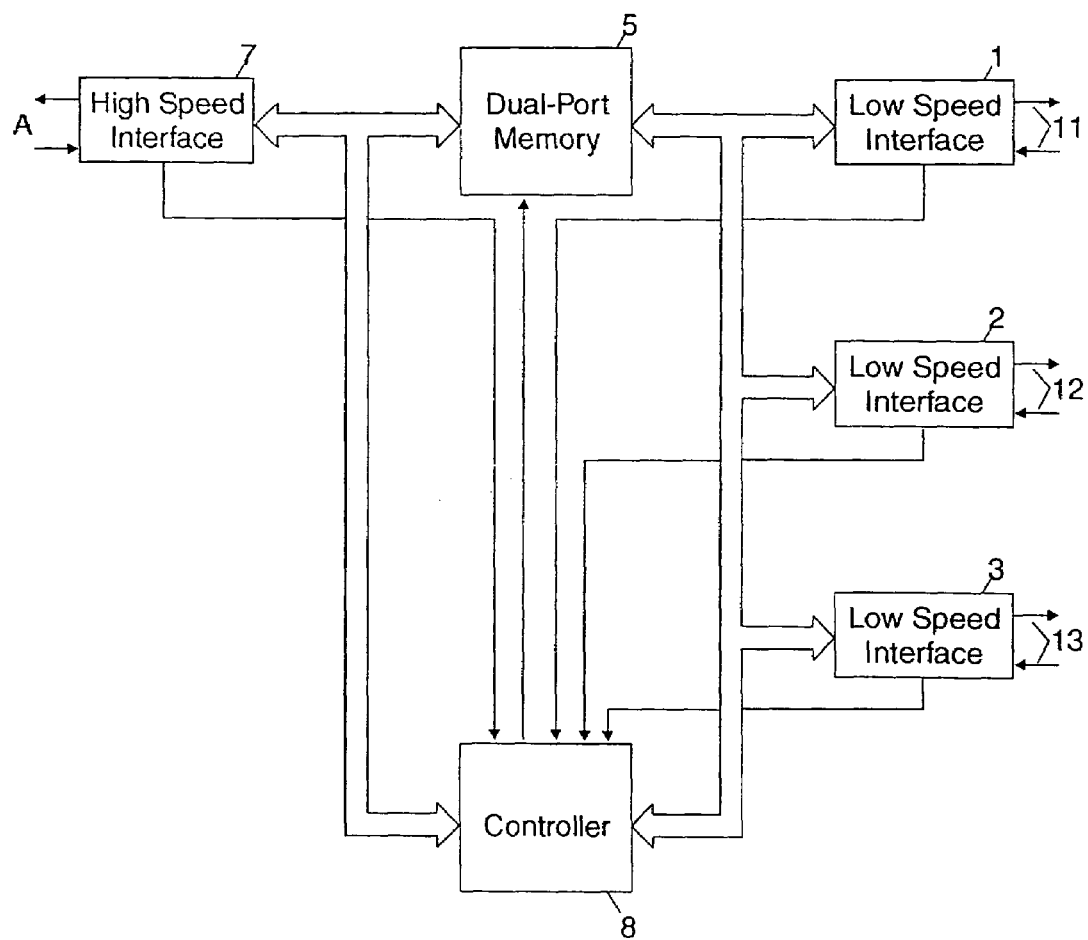

With reference to FIG. 2, such a device essentially comprises:

a memory 5, a dual port memory according to the preferred embodiment, a first 1, a second 2 and a third 3 low speed interfaces connected from one side with the right port of the memory 5 and from the other side with respectively the first 11; the second 12 and the third 13 network links, a high speed interface 7 connected with a workstation and with the left part of the memory 5, and a controller 8 for controlling the interfaces and the memory.

Figure 3:
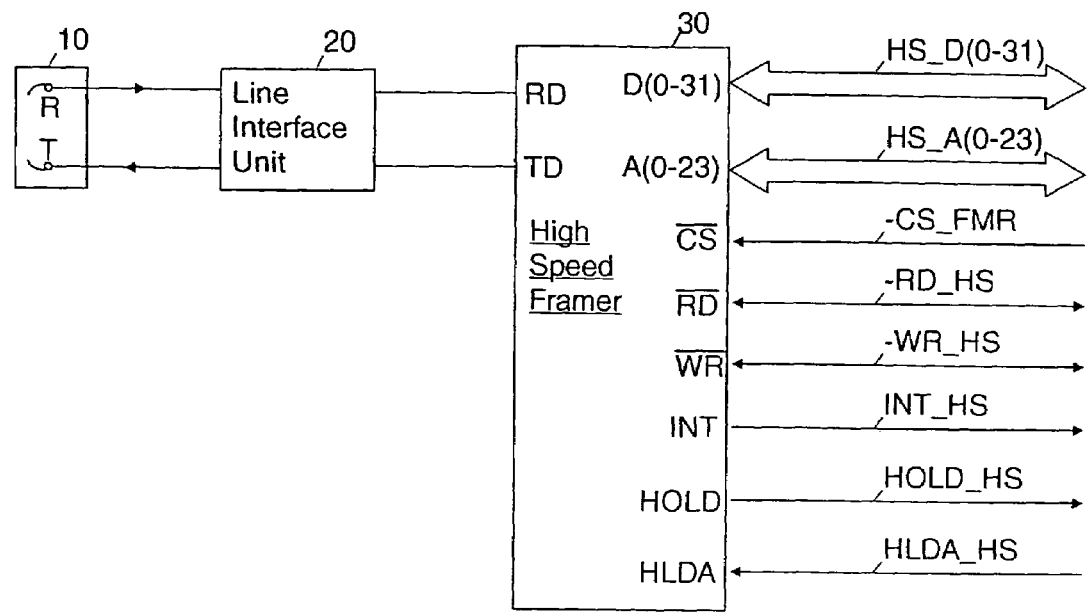

With reference to FIG. 3, the high speed interface 7 is described with more details. It is made of a high speed line connector 10, a line interface unit 20 and a high speed framer 30. The receive data pin R and the transmit data pin T of this line connector are respectively connected to the transmit data line and the receive data line of the workstation.

The line interface unit 20 is connected from one side with the receive R and transmit T data pins of the high speed line connector 10, and from the other side with the receive RD and transmit TD data pins of the high speed framer 30. It converts the signals received from the line connector 10 in TTL signals according to the I.T.U. (International Telecommunication Union) specifications.

The high speed framer 30 takes care of the framing protocol on the high speed link and transmits data received from the line interface unit 20 on a 32 bits high speed data bus HS_D with a 24 bits high speed address bus HS_A. It is not described in more details since the invention applies to any kind of digital high speed link. One could refer to "TAXI 100 Mbps", "OC3 155 Mbps" or "OC12 622 Mbps" interfaces specified by the I.T.U.

Figure 4:
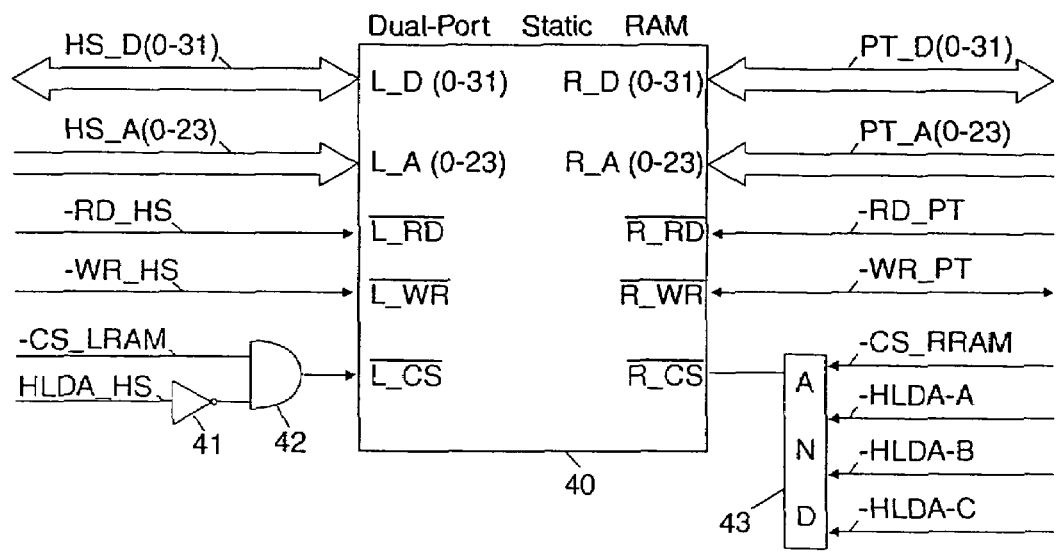

With reference to FIG. 4, a dual port static memory 40 is connected on its left data port L_D and left address port L_A respectively with the high speed data bus HS_D and address bus HS_A. Similarly, the right data port R_D and the right address port R_A ports are connected with a 32 bits low speed data bus PT_D and with a 24 bits low speed address bus PT_A.

Figure 5:
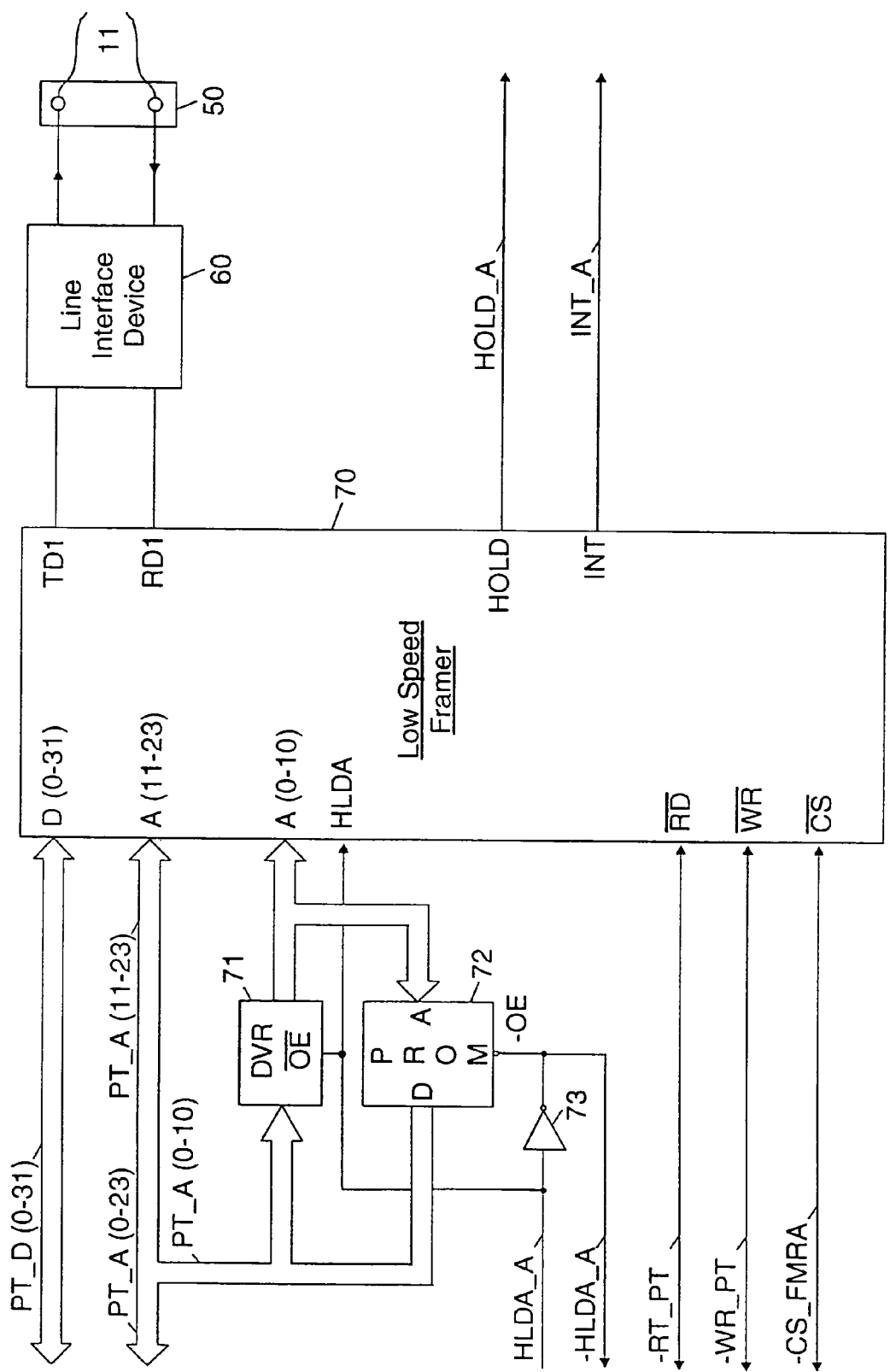

With reference to FIG. 5, the first low speed interface 1 is made of a first low speed line connector 50, a first line interface device 60 and a first low speed framer 70.

The first link 11 of the network is connected with the transmit and receive data pins of the first low speed line connector 50.

The first line interface device 60 is connected from one side with the receive and transmit data pins of the first low speed line connector 50 and from the other side with the receive RD1 and transmit TD1 data pins of the first low speed framer 70. It converts the signals received from the low speed framer in order that they can be transmitted on the network.

The first low speed framer 70 is connected with the low speed data bus PT_D. It is also connected with bits 11 to 23 of the low speed address bus PT_A. Address bits 0 to 10 are connected to a first programmable read only memory 72 and to a first driver 71. This driver insulates or transmits the eleven first address bits issued from the first low speed framer 70 according to the state of a signal, a first hold acknowledge signal HLDA_A which will be specified later.

Figure 6:
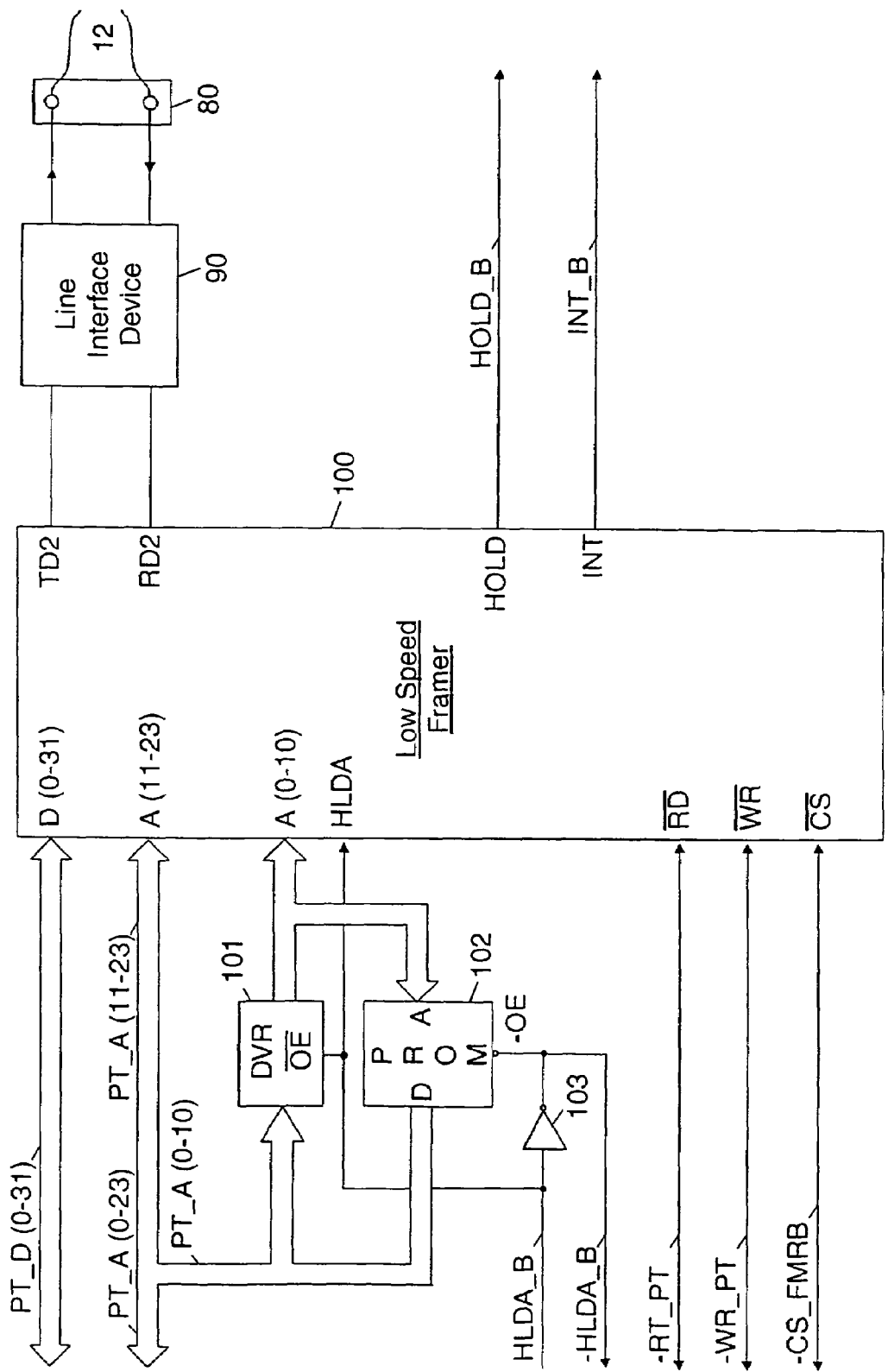

With reference to FIG. 6, similarly, the second low speed interface 2 is made of a second low speed line connector 80, a second line interface device 90 and a second low speed framer 100.

The second link 12 of the network is connected with the transmit and receive data pins of the second low speed line connector 80.

The second line interface device 90 is connected from one side with the receive and transmit data pins of the second low speed line connector 80 and from the other side with the receive RD2 and transmit TD2 data pins of the second low speed framer 100.

The second low speed framer 100 is connected with the low speed data bus PT_D. It is also connected with bits 11 to 23 of the low speed address bus PT_A. Address bits 0 to 10 are connected to a second programmable read only memory 102 and to a second driver 101. This driver is controlled by another signal, a second hold acknowledge signal HLDA_B which will be specified later.

Figure 7:
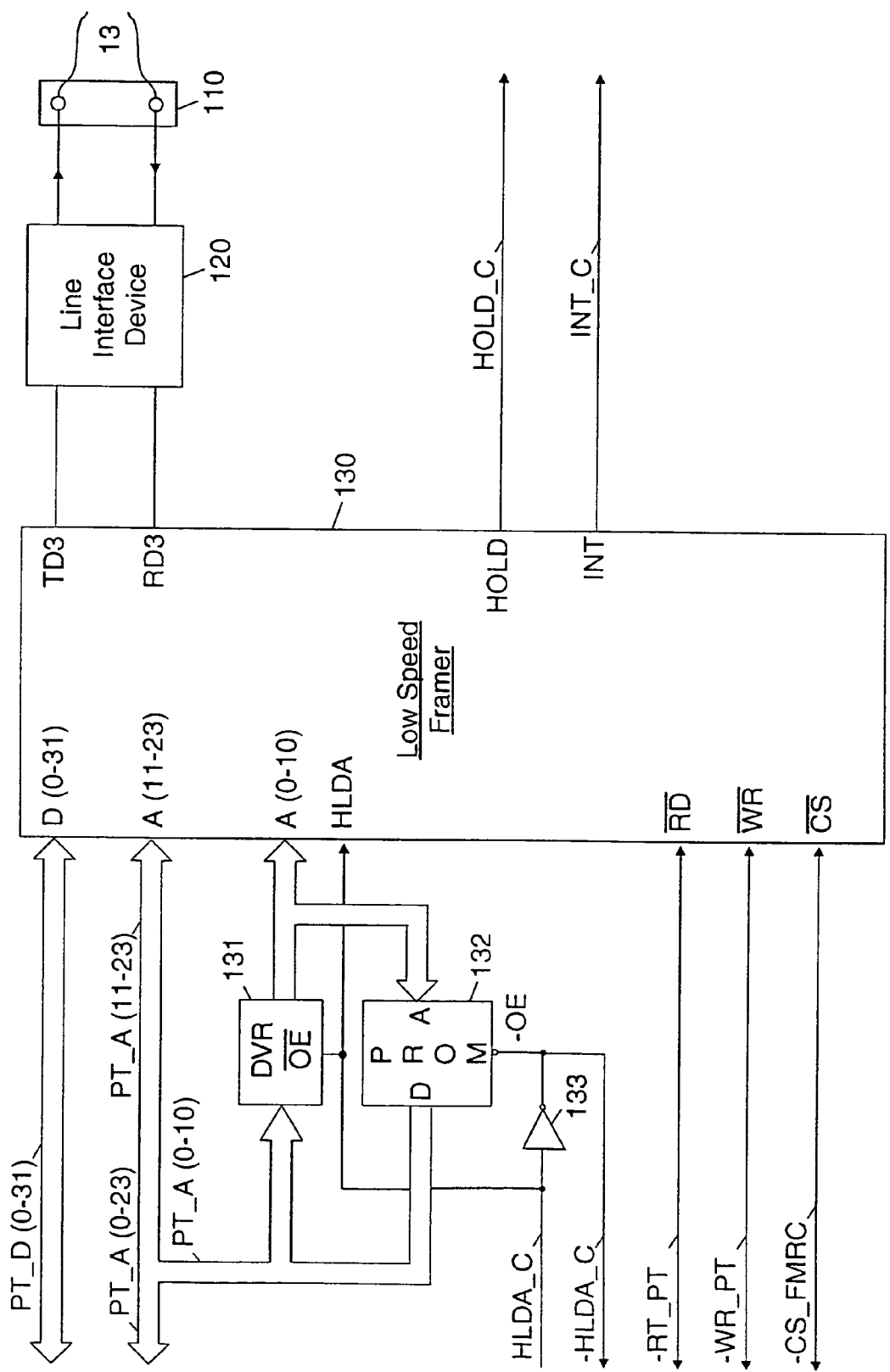

With reference to FIG. 7, similarly, the third low speed interface 3 is made of a third low speed line connector 110, a third line interface device 120 and a third low speed framer 130.

The third link 13 of the network is connected with the transmit and receive data pins of the third low speed line connector 110.

The third line interface device 120 is connected from one side with the receive and transmit data pins of the third low speed line connector 110 and from the other side with the receive RD3 and transmit TD3 data pins of the third low speed framer 130.

The third low speed framer 130 is connected with the low speed data bus PT_D. It is also connected with bits 11 to 23 of the low speed address bus PT_A. Address bits 0 to 10 are connected to a third programmable read only memory 132 and to a third driver 131. This driver is controlled by another signal, a third hold acknowledge signal HLDA_C which will be specified later.

Figure 8:
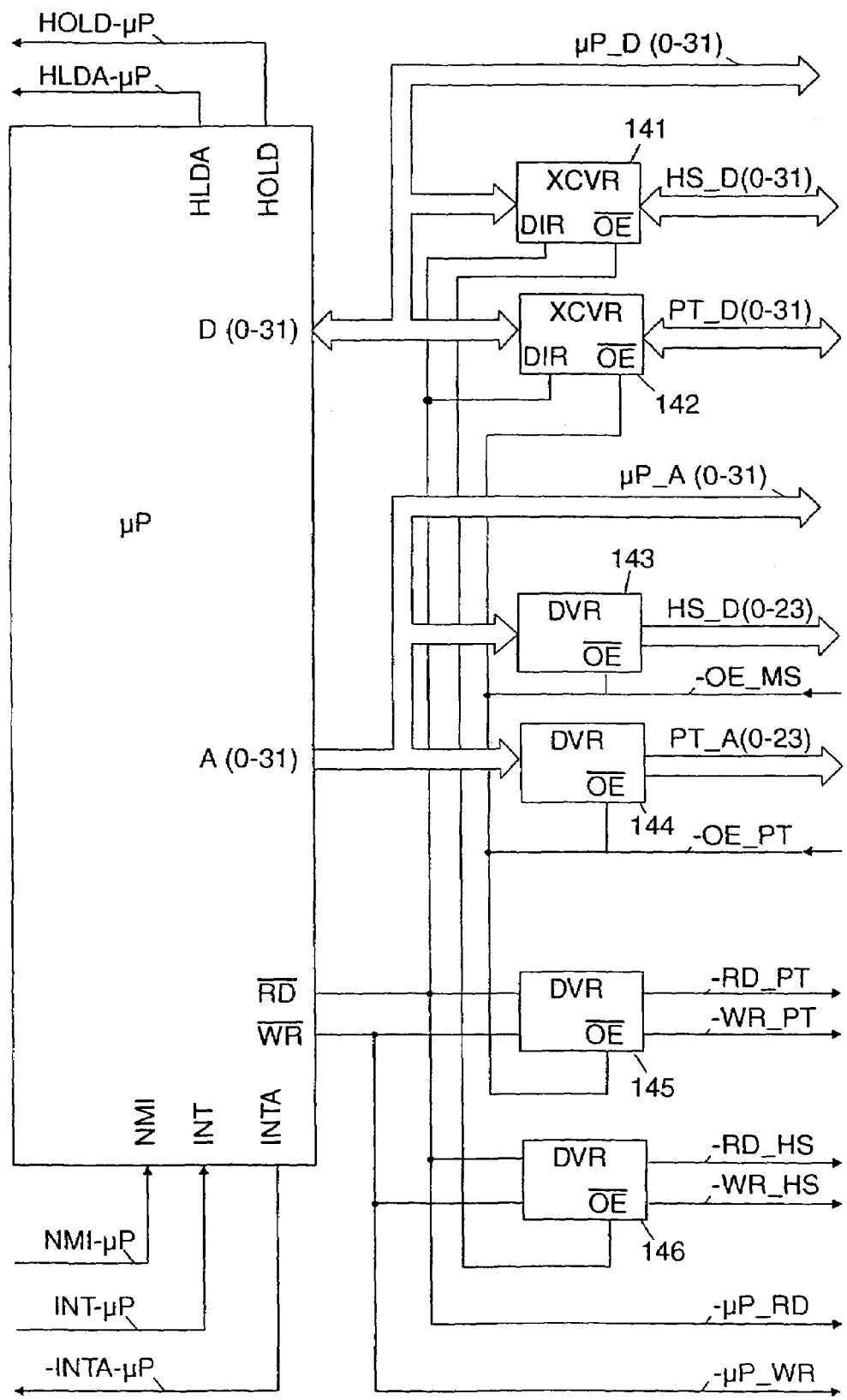

With reference to FIG. 8, the controller 8 comprises a microprocessor 140 and several interfaces. The data bus µP_D of the microprocessor 140 is connected to the high speed data bus HS_D through a first transceiver 141. This transceiver insulates, transmits from the microprocessor to the bus, or transmits from the bus to the microprocessor according to a driving signal and to a direction signal. The driving signal, a second driving signal -OE_HS, and the direction signal, a complementary read signal -µP_RD will be detailed later on.

The data bus µP_D of the microprocessor 140 is also connected to the low speed data bus PT_D through a second transceiver 142. This transceiver insulates, transmits from the microprocessor to the bus, or transmits from the bus to the microprocessor according to another driving signal and to the same direction signal. This other driving signal, a first driving signal -OE_PT will be detailed later on.

The address bus µP_A of this microprocessor is connected to:

the high speed address bus HS_A through a fourth driver 143, and to.

the low speed address bus PT_A through a fifth driver 144.

The complementary read µP_RD and write µP_WR ports of the microprocessor are respectively applied to a sixth 145 and a seventh 146 drivers.

Figure 9:
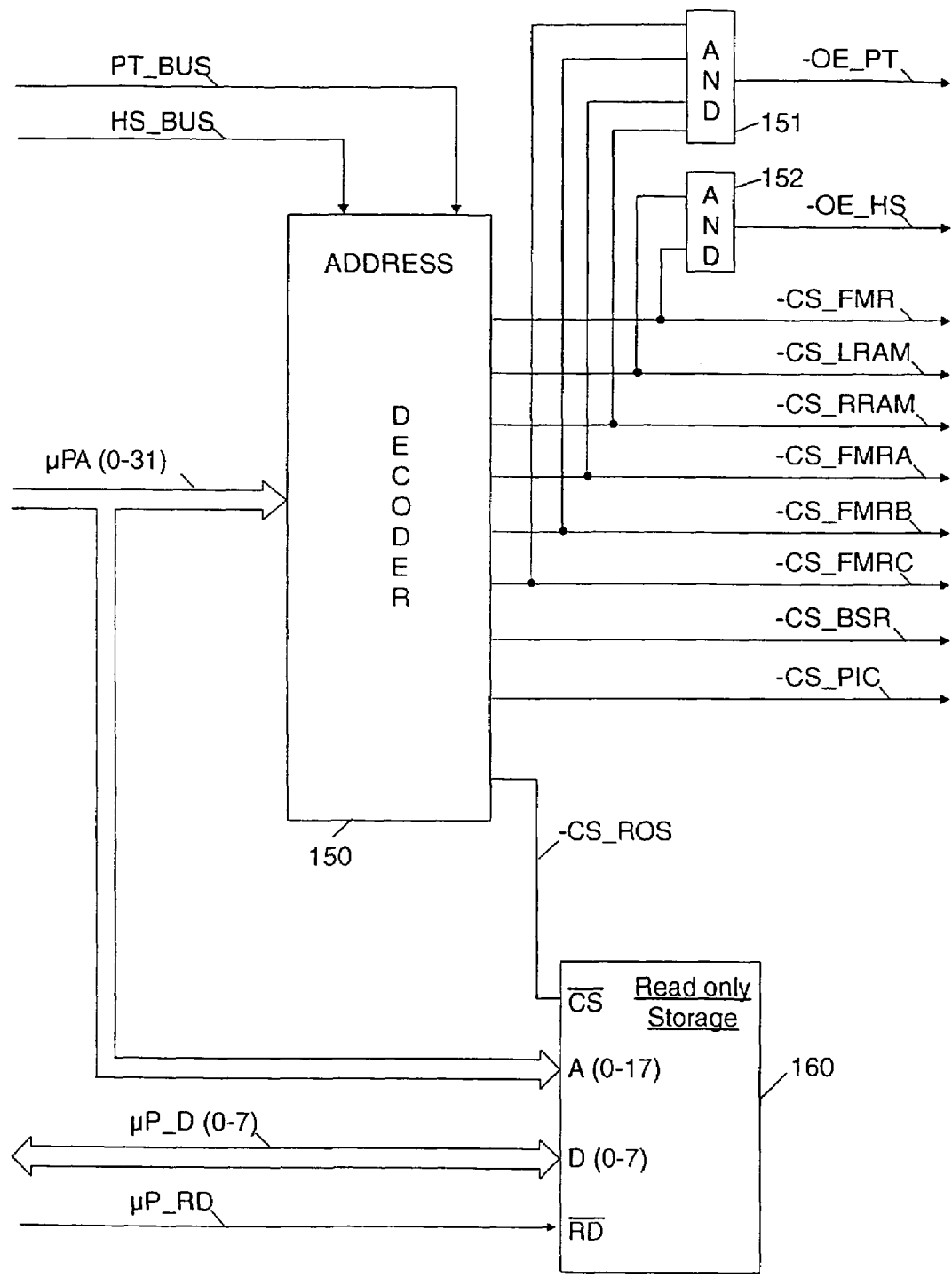

With reference to FIG. 9, an address decoder 150 is connected to the microprocessor address bus µP_A. It further receives a high speed control signal HS_BUS and a low speed control signal PT_BUS in order to produce a plurality of chip select signals:

complementary chip select high speed framer -CS_FMR, applied to the complementary chip select port of the high speed framer 30;

complementary chip select left port of static memory -CS_LRAM;

complementary chip select right port of static memory -CS_RRAM;

complementary chip select first low speed framer -CS_FMRA;

complementary chip select second low speed framer -CS_FMRB;

complementary chip select third low speed framer -CS_FMRC;

complementary chip select bus select register -CS_BSR;

complementary chip select interrupt controller -CS_PIC;

complementary chip select read only storage -CS_ROS.

A first AND gate 151 receives the complementary chip select right port of static memory -CS RRAM, first low speed framer -CS_FMRA, second low speed framer -CS_FMRB and third low speed framer -CS_FMRC for producing the first driving signal -OE_PT applied to the second transceiver 142, the fifth 144 and sixth 145 drivers.

A second AND gate 152 receives the complementary chip select high speed framer -CS_FMR and left port of static memory -CS_LRAM for producing the second driving signal -OE_HS applied to the first transceiver 141, the fourth 143 and the seventh 146 drivers.

Besides, a read only storage ROS 160 is used to store the software. It receives the complementary chip select read only storage -CS_ROS and the complementary read signal μP_RD produced by the microprocessor 140. It is also connected to bits 0 to 17 of the microprocessor address bus μP_A and to bits 0 to 7 of the microprocessor data bus μP_D.

With reference to FIG. 10, an interrupt controller 170 is connected with bits 0 to 7 of the microprocessor data bus μP_D and with bits 0 to 5 of the microprocessor address bus μP_A. It produces an interruption signal INT_μP applied to the microprocessor 140 from the following signals that is receives:

the complementary chip select interrupt controller -CS_PIC, the complementary read signal -μP_RD, the complementary write signal -μP_WR, a microprocessor interrupt acknowledge signal INTA from microprocessor 140, a high speed framer interrupt signal INT_HS from the high speed framer 30, a first low speed framer interrupt signal INT_FMRA from the first low speed framer 70, a second low speed framer interrupt signal INT_FMRB from the second low speed framer 100, and a third low speed framer interrupt signal INT_FMRC from the third low speed framer 130.

Besides, an arbiter 180 is used to manage the bus requests of the three low speed framers. It receives:

a first hold signal HOLD_A from the first low speed framer 70, a second hold signal HOLD_B from the second low speed framer 100, a third hold signal HOLD_C from the third low speed framer 130, and a low speed hold acknowledge signal PT_HLDA from a device described later on.

It produces the first hold acknowledge signal HLDA_A for the first low speed framer 70, the second hold acknowledge signal HLDA_B for the second low speed framer 100, the third hold acknowledge signal HLDA_C for the third low speed framer 130 and, a low speed hold signal PT_HOLD.

Figure 11:
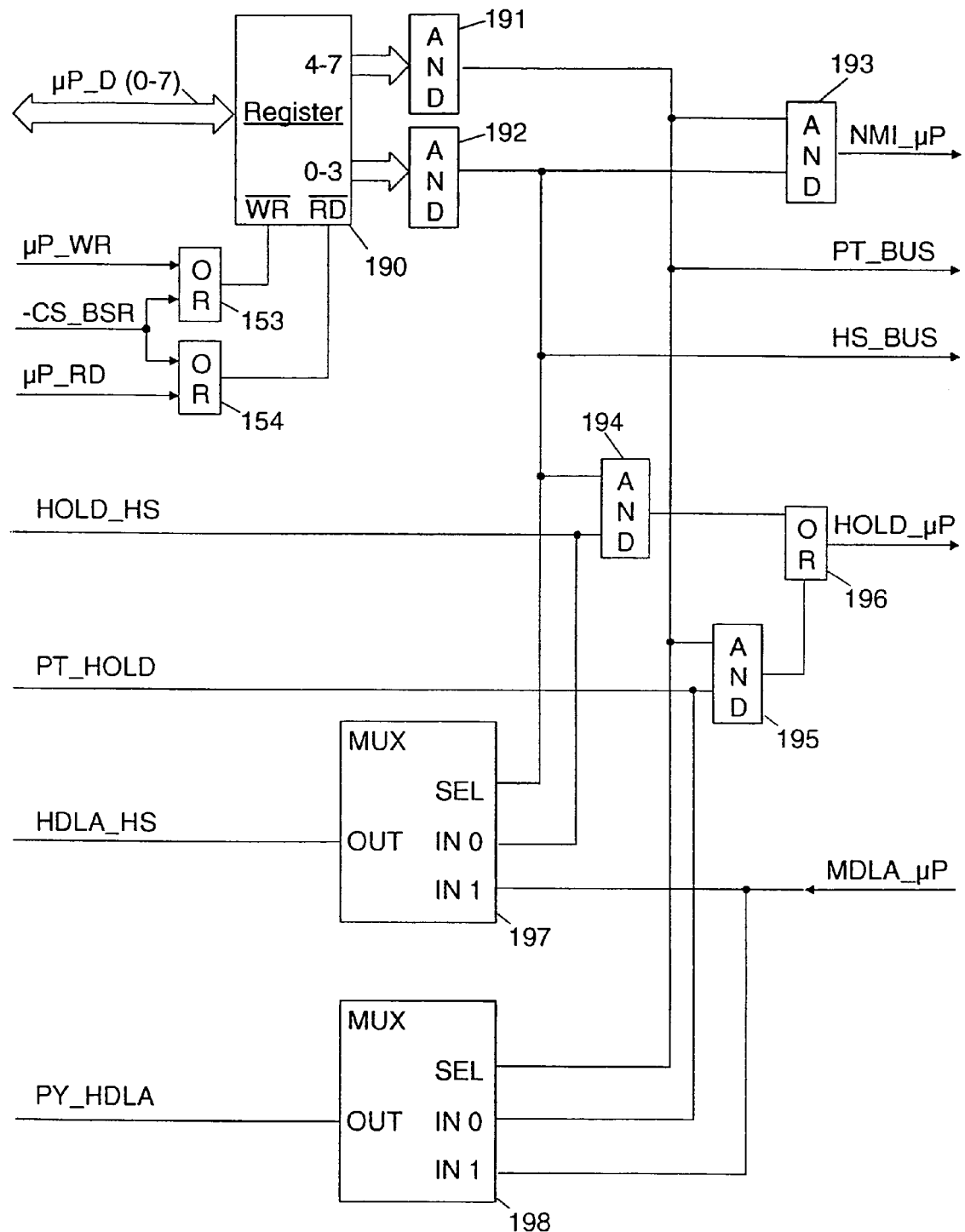

With reference to FIG. 11, a register, the bus select register 190 is provided for storing bits 0 to 7 of the microprocessor data bus μP_D.

The complementary write input of this register is connected with the output of a first OR gate 153 which receives the complementary write signal -μP_WR from the microprocessor 140 and the complementary chip select bus select register -CS_BSR from the address decoder 150.

The complementary read input of the register 190 is connected with the output of a second OR gate 154 which receives the complementary read signal -μP_RD from the microprocessor 140 and the complementary chip select bus select register -CS_BSR from the address decoder 150.

A third AND gate 191 receives bits 4 to 7 of the register 190 for producing the low speed control signal PT_BUS received by the address decoder 150 (FIG. 9).

A fourth AND gate 192 receives bits 0 to 3 of the register 190 for producing the high speed control signal HS_BUS received by the address decoder.

A fifth AND gate 193 receives the low speed PT_BUS and high speed HS_BUS control signals for producing a non maskable interruption signal NMI_μP received by the microprocessor 140.

A sixth AND gate 194 receives the high speed control signal HS_BUS and a high speed hold signal HOLD_HS (from the high speed framer, 30 FIG. 3).

A seventh AND gate 195 receives the low speed control signal PT_BUS and the low speed hold signal PT_HOLD (from arbiter 180, FIG. 10).

A third OR gate 196 whose inputs are connected to outputs of sixth 194 and seventh 195 AND gates produces a bus request signal HOLD_μP which is applied on the hold input of the microprocessor 140.

A first multiplexer 197 produces a high speed hold acknowledge signal HLDA_HS which is applied on the HLDA input of the high speed framer 30 (FIG. 3). The selection input receives the high speed control signal HS_BUS. The first data input receives the high speed hold signal HOLD_HS (from the high speed framer 30, FIG. 3). The second data input receives a bus acknowledge signal HLDA_μP generated by the microprocessor 140 on its HLDA output.

A second multiplexer 198 produces the low speed hold acknowledge signal PT-HLDA intended for the arbiter 180 (FIG. 10). The selection input receives the low speed control signal PT_BUS. The first data input receives the low speed hold signal PT_HOLD from arbiter 180. The second data input receives the bus acknowledge signal HLDA_μP.

The operation of the device according to the invention will now be explained, when a file is transmitted on the network by a workstation.

The previously described architecture allows the microprocessor 140, the high speed framer 30 and the three low speed framers 70, 100, 130 to work in parallel.

As an example, the address decoder 150 operates according to the following microprocessor address bus μP_A states, addresses or data bytes being noted in hexadecimal:

μP_A comprised between F0000000 and FFFFFFFF: complementary chip select read only storage -CS_ROS activated;

μP_A comprised between 70000000 and 7FFFFFFF, and high speed control signal HS_BUS equals 1, and low speed control signal PT_BUS equals 0, then complementary chip select high speed framer -CS_FMR activated;

μP_A comprised between 60000000 and 6FFFFFFF, and high speed control signal HS_BUS equals 0, and low speed control signal PT_BUS equals 1, then complementary chip select first low speed framer -CS_FMRA activated;

μP_A comprised between 50000000 and 5FFFFFFF, and high speed control signal HS_BUS equals 0, and low speed control signal PT_BUS equals 1, then complementary chip select second low speed framer -CS_FMRB activated;

μP_A comprised between 40000000 and 4FFFFFFF, and high speed control signal HS_BUS equals 0, and low speed control signal PT_BUS equals 1, then complementary chip select third low speed framer -CS_FMRC activated;

μP_A comprised between 30000000 and 3FFFFFFF: complementary chip select register -CS_BSR activated;

μP_A comprised between 20000000 and 2FFFFFFF: complementary chip select interrupt controller -CS_PIC activated;

μP_A comprised between 10000000 and 1FFFFFFF, and high speed control signal HS_BUS equals 1, and low speed control signal PT_BUS equals 0, then complementary chip select left port static memory -CS_LRAM activated;

μP_A comprised between 00000000 and 0FFFFFFF, and high speed control signal HS_BUS equals 1, and low speed control signal PT_BUS equals 0, then complementary chip select right port static memory -CS_RRAM activated.

The high speed HS_BUS and low speed PT_BUS control signals are decoded from the bus select register 190. When this register is programmed with 0F, the fourth AND gate 192 sets the high speed control signal HS_BUS to 1. When it is programmed with F0, the third AND gate 191 sets the low speed control signal PT_BUS to 1. When the register is programmed by mistake with FF, the fifth AND gate 193 activates the non maskable interruption signal NMI_μP.

When this register is cleared, no control signal is activated, which disables the microprocessor 140 to access high speed or low speed framers.

Therefore, after reset, the read only storage 160 is selected and the microprocessor 140 runs the initialization code. A specific action is to program the internal Direct Memory Access of each framer with buffer transmit and receive addresses. Another action is to clear the bus select register 190. When the initialization code has been run, the microprocessor enters a wait state until an interruption occurs.

The data flow from a workstation to the network will now be described.

With reference to FIG. 12, workstation A transmits a 2048 bytes file at speed rate F. The first low speed framer 70 operates at speed rate 5F/8, the second one 100 at rate F/4 and the third one 130 at rate F/8.

These bytes are coming from the line connector 10, they are converted into TTL level by the line interface unit 20 and they are received by the high speed framer 30 in a FIFO (First in, First out) register. When this FIFO register reaches a threshold, the high speed framer 30 requests the bus by activating the high speed hold signal HOLD_HS. This hold signal activates the high speed hold acknowledge signal HLDA_HS through the first multiplexer 197, which means that the signal granting the bus to the high speed framer is its own bus request. This allows the microprocessor 140 to control other elements while the high speed framer 30 transfers data to the static memory 40.

When the high speed hold acknowledge signal HLDA_HS is activated, the left port of the static memory 40 is selected on its complementary chip select port by means of an inverter 41 and an OR gate 42 intended for realizing the logic operation (-HLDA_HS)+(-CS_LRAM).

Therefore, the high speed framer 30 transfers the data bytes from its FIFO to a receive buffer of the static memory 40. The base address of this buffer was loaded by the microprocessor 140 during the initialization procedure. When the FIFO is empty, the high speed framer deactivates the high speed hold signal HOLD_HS. When the whole file is received and stored in the static memory, the high speed framer 30 activates the high speed framer interrupt signal INT_HS. This signal is transmitted to the microprocessor 140 through the interrupt controller 170, which leads to the execution of the following routine:

the bus select register 190 is loaded with 0F, which activates the high speed control signal HS_BUS, and consequently the bus request signal HOLD_P;

a new receive buffer address is allocated to the high speed framer 30, the three byte counts for the low speed framers are calculated:

first low speed framer 70: 2048.5/8=1280 second low speed framer 100: 2048/4=512 third low speed framer 130: 2048/8=256 each low speed framer is programmed with its byte count, the base address of the receive buffer (each framer has the same address), and is instructed to start the transmission, a framer counter is loaded with 3, the number of low speed framers.

At the end of this routine, the microprocessor 140 enters again the wait state.

The low speed framers activates their respective hold signals HOLD_A, HOLD_B, HOLD_C, in order to start the transmission. Consequently, the arbiter 180 activates the fourth operate signal PT_HOLD, which leads to the activation of the low speed acknowledge signal PT_HLDA by the second multiplexer 198. As seen above, this mechanism allows the microprocessor 140 to control other elements.

When the first low speed framer 70 has the highest priority, the arbiter activates the first hold acknowledge signal HLDA_A. This signal activates the static memory 40 on its complementary chip select right port by means of a AND gate which realizes the logic operation (-CS_RRAM).(-HLDA_A).(-HLDA_C). Data bytes can therefore be transferred from the static memory 40 to the first link 11 of the network through the first line interface device 60.

This transfer is controlled by the internal Direct Memory Access which generates a complementary read control signal -RD_PT and the bytes addresses. The lowest 11 bits of such generated addresses are entered into the first programmable read only memory 72. This memory 72 which is enabled by the complement of the first hold acknowledge signal HLDA_A by means of an inverter 73, outputs lowest 11 bits of the required address on the low speed address bus PT_A. Besides, the highest 13 bits of the required address are directly entered on the low speed address bus. The address translation by means of the programmable memory 72 allows the low speed framer to transmit its own data bytes in the right order.

The translation tables corresponding to first 72, second 102 and third 132 programmable read only memory are respectively shown in FIGS. 13, 14 and 15.

When the first low speed framer 70 has loaded its internal transmit FIFO register, it releases the first hold signal HOLD_A.

The same transmission process can then be executed by the second 100, and afterwards by the third 130 low speed framer.

When a low speed framer has completed its transmission, it activates its associated interrupt signal. This signal is forwarded to the microprocessor 140 through the interrupt controller 170 and the following routine is executed:

the bus select register 190 is loaded with F0 and the low speed hold signal PT_HOLD being activated, the bus request signal is therefore activated;

the microprocessor decrements the framer counter;

if a new file has been received by the high speed framer 30, the Direct Memory Access of this low speed framer is reprogrammed to start this new file transmission;

the bus select register 190 is reset.

At the end of this routine, the microprocessor 140 enters again the wait state. When the framer counter is cleared, it means that the file associated with this counter has been totally transmitted.

It will now be explained how a device operates when a file is received by a workstation from the network.

In an initialization step, the Direct Memory Access of each low speed framer 70, 100, 130 is programmed with the base address of a receive buffer in the static memory 40. The data bytes come from the three network links 11, 12, 13 at various rates and with different framing protocols, which is managed by the corresponding line interface devices 60, 90, 120 with their associated framers 70, 100, 130. Data bytes coming from a link are therefore stored into the FIFO register of the corresponding low speed framer. When this FIFO register reaches a threshold, this framer requests the bus in order to transfer the received data bytes into the static memory 40. The mode of operation is the same as the one described above dealing with a file transmission from a workstation to the network.

At the end of a reception by a low speed framer, the microprocessor 140 receives an interrupt from this framer through the interrupt controller 170 and the following routine is executed:

the bus select register 190 is loaded with F0 and, the low speed hold signal PT_HOLD being activated, the bus request signal HOLD_µP is therefore activated;

the microprocessor 140 increments a link counter associated with the file reception and stores the number of bytes of this file received by this low speed framer;

a new receive buffer address is given to the low speed framer, for the next reception;

the bus select register 190 is reset.

At the end of this routine, the microprocessor 140 enters again the wait state.

The link counter is incremented by each low speed framer at the end of a reception. Therefore, when this counter reaches the number 3, it means that an entire file has been stored into the receive buffer. The following routine is then executed by the microprocessor 140:

calculates the number of bytes of this file received by the three low speed framers;

loads the bus select register 190 with 0F;

programs the Direct Memory Access of the high speed framer 30 with the receive buffer address and the total byte count;

starts the transmission to the workstation;

resets the bus select register 190.

The high speed framer 30 therefore transfers data bytes from the static memory 40 to the workstation. The mode of operation previously described remains the same.

At the end of the transmission, the microprocessor 140 receives an interrupt. The main subsequent action is to release the receive buffer which has been used.

According to another embodiment, the invention finds a useful application when the low speed interfaces are connected to the network links 11, 12, 13 through low speed modems.

Figure 16:
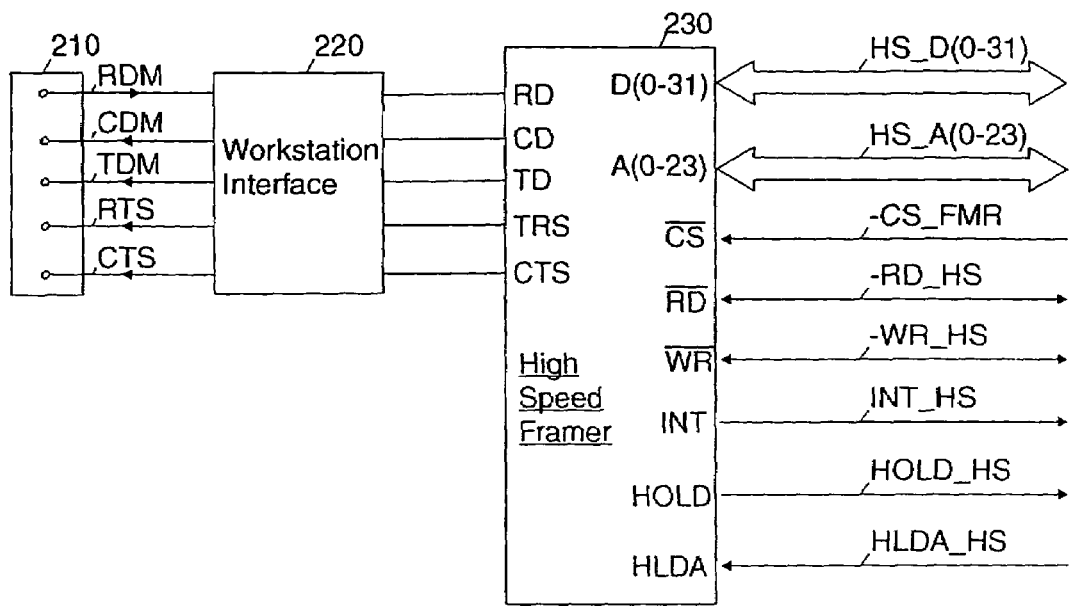

In this case, with reference to FIG. 16, the high speed interface comprises now a high speed connector 210 instead of the high speed line connector 10, a workstation interface 220 instead of the line interface unit 20 and a high speed framer 230.

The high speed connector 210 provides a set of signals that are necessary for the attachment of a modem, essentially a receive data signal RDM, a transmit data signal TDM, a carrier detect signal CDM, a request to send signal RTS and a clear to send signal CTS.

The workstation interface 220 is connected from one side with the high speed connector 210, and from the other side with the corresponding ports of the high speed framer 230. It takes care of the analog characteristics of these signals that, for instance, follow specification V.24 for data rates up to 19.2 Kbps, V.35 for data rates up to 2 Mbps or X.21 for data rates up to 10 Mbps.

The high speed framer 230 is equivalent to this one described with reference to FIG. 3, just as the high speed connector and the workstation interface are respectively equivalent to the high speed line connector and the line interface.

Figure 17:
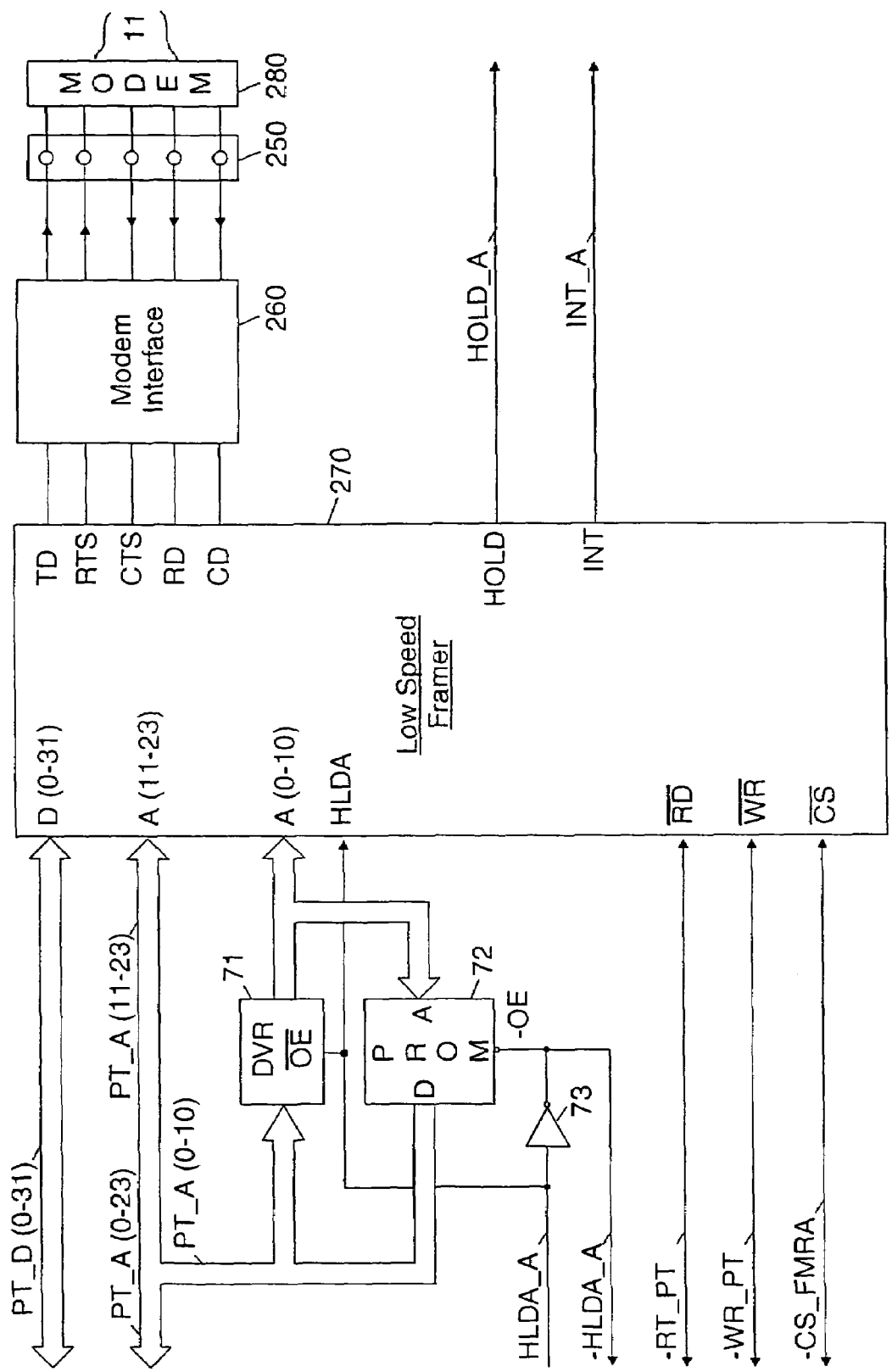

With reference to FIG. 17, the first low speed interface now comprises a first low speed connector 250 instead of the first low speed line connector 50, a first modem interface 260 instead of the first line interface device 60 and a first low speed framer 270.

The first link 11 of the network is connected with a first modem 280 itself connected with the first low speed connector 250.

The first modem interface 260 converts the signals received from the low speed framer in order that they can be transmitted on the network.

The first low speed framer 270 takes care of the protocol on the low speed link 11.

Naturally, the second and third low speed interfaces are modified in the same way as the first one.

The device operates the same way as described in previous modes of operations.

The scope of the present invention is in no way limited to the above embodiments. In particular, any means or steps could be replaced by equivalent means, respectively steps.

The invention claimed is:

1. A communication device for transferring data between two devices coupled to a network, said communication device comprising:

a dual-port memory for storing data;

a high-speed interface for transmitting said data between a first device and said dual-port memory, wherein said high-speed interface communicates data at an initial rate;

a plurality of low-speed interfaces, each connected to a respective one of a plurality of links to said second device, for transmitting data from said dual-port memory to said respective one of said plurality of links at one of a plurality of data rates, wherein at least two of said plurality of data rates are unequal and are fractions of said initial rate, all said fractions being capable of reduction to a common denominator and at least one of said fractions being irreducible; and a controller for controlling said memory and said interfaces and for monitor a data rate of said data between said memory and said plurality of links, wherein said controller includes means for cyclically distributing data to be communicated from said memory to said second device among said low-speed interfaces, such that each of said plurality of low speed interfaces receives a number of consecutive units of said data equal to the numerator of its associated fraction.

2. The communication device of claim 1, wherein at least one of the set of said high-speed interface and said plurality of low speed interfaces comprises means for establishing a connection with a modem.

3. The communication device of claim 1, said high speed interface further comprises means for receiving said data at said initial rate, wherein said initial rate is equal to a sum of said plurality of data rates.

4. The communication device of claim 3, wherein at least two of said data rates are equal.

5. The communication device of claim 1, wherein said initial rate equals a sum of said plurality of data rates.

6. The communication device of claim 1, said controller former comprises means for reporting said data rates.

7. The communication device of claim 1, wherein:
said high speed interface further comprises means for transmitting said data at said initial rate, wherein said initial rate is equal to a sum of said plurality of data rates and at least two of said data rates are unequal.

8. A computer program product in a computer-readable medium for transferring data between two devices coupled to a network, said computer program product comprising:
a computer-readable medium;
instructions on the computer-readable medium for storing data in a dual-port memory;
instructions on the computer-readable medium for transmitting, across a high-speed interface, said data between a first device and said dual-port memory, wherein said high-speed interface communicates data at an initial rate;
instructions on the computer-readable medium for regulating a plurality of low-speed interfaces, each of said plurality of low-speed interfaces being connected to a respective one of a plurality of links to said second device for transmitting data from said dual-port memory to said respective one of said plurality of links at one of a plurality of data rates, wherein at least two of said plurality of data rates are unequal and are fractions of said initial rate, all said fractions being capable of reduction to a common denominator and at least one of said fractions being irreducible; and
instructions on the computer-readable medium for cyclically distributing data to be communicated from said memory to said second device among said low-speed interfaces, such that each of said plurality of low speed interfaces receives a number of consecutive units of said data equal to the numerator of its associated fraction.

9. The computer program product of claim 8, wherein at least one of the set of instructions for transmitting across a high-speed interface and instructions for regulating plurality of low speed interfaces comprises instructions for establishing a connection with a modem.

10. The computer program product of claim 8, wherein said instructions for transmitting across a high-speed interface further comprise instructions for receiving said data at said initial rate, wherein said initial rate is equal to a sum of said plurality of data rates.

11. The computer program product of claim 10, wherein said transmitting instructions further comprise instructions for transmitting when at least two of said data rates are equal.

12. The computer program product of claim 8, wherein said transmitting instructions further comprise instructions for setting said initial rate equal to a sum of said plurality of data rates.

13. The computer program product of claim 8, wherein said operating instructions further comprise instructions for reporting said data rates.

14. The computer program product of claim 8, wherein:
said instructions for transmitting across said high-peed interface further comprise instructions for transmitting said data at said initial rate, when said initial rate is equal to a mum of said plurality of data rates and at least two of said data rates are unequal.

15. A method for transferring data between two devices coupled to a network, said method comprising:
storing data in a dual-port memory;
transmitting said data across a high-speed interface between a first device and said dual-port memory, wherein said transmitting further comprises transmitting across said high-speed interface at an initial rate;
operating a plurality of low-speed interfaces, each connected to a respective one of a plurality of links to said second device, for transmitting data from said dual-port memory to said respective one of said plurality of links at one of a plurality of data rates, wherein at least two of said plurality of data rates are unequal and are fractions of said initial rate, all said fractions being capable of reduction to a common denominator and at least one of said fractions being irreducible; and
controlling a data rate of said data between said memory and said plurality of links, wherein said controlling includes cyclically distributing data to be communicated from said memory to said second device among said low-speed interfaces, such that each of said plurality of low speed interfaces receives a number of consecutive units of said data equal to the numerator of its associated fraction.

16. The method of claim 15, wherein at least one of the set of said transmitting and said operating step further comprise establishing a connection with a modem.

17. The method of claim 15, wherein said transmitting step further comprises step of receiving said data at said initial rate, wherein said initial rate is equal to a sum of said plurality of data rates.

18. The method of claim 17, said transmitting step further comprises transmitting wherein at least two of said data rates are equal.

19. The method of claim 15, wherein said transmitting step further comprises transmitting at an initial rate equal to a sum of said plurality of data rates.

20. The method of claim 15, wherein said controlling step further report said data rates.

* * * * *

UNITED STATES PATENT AND TRADEMARK OFFICE
CERTIFICATE OF CORRECTION

PATENT NO. : 7,085,802 B1  Page 1 of 1
APPLICATION NO. : 09/680798
DATED : August 1, 2006
INVENTOR(S) : Benayoun et al.

It is certified that error appears in the above-identified patent and that said Letters Patent is hereby corrected as shown below:

In Claim 1, at column 11, line 7, delete "monitor" and insert --monitoring--.

In Claim 14, at column 12, line 23, delete "mum" and insert --sum--.

Signed and Sealed this

Nineteenth Day of December, 2006

JON W. DUDAS
*Director of the United States Patent and Trademark Office*